United States Patent [19]

Villamar

[11] Patent Number: 5,698,246

[45] Date of Patent: Dec. 16, 1997

[54] FOODSTUFF FOR AND METHOD OF FEEDING CRUSTACEANS AND FISH

[75] Inventor: Daniel F. Villamar, Maple Grove, Minn.

[73] Assignee: Cargill, Incorporated, Minneapolis, Minn.

[21] Appl. No.: 592,946

[22] Filed: Jan. 29, 1996

[51] Int. Cl.$^6$ .................................................. A23D 7/06
[52] U.S. Cl. ..................... 426/54; 426/2; 426/53; 426/623; 426/635
[58] Field of Search ................... 426/2, 590, 53, 426/54, 635, 623

[56] References Cited

U.S. PATENT DOCUMENTS

| | | |
|---|---|---|
| 2,800,457 | 7/1957 | Green et al. . |
| 3,341,416 | 9/1967 | Anderson et al. ............... 167/83 |
| 3,577,515 | 5/1971 | Vandegaer ....................... 424/32 |
| 4,087,376 | 5/1978 | Foris et al. ...................... 252/316 |
| 4,285,720 | 8/1981 | Scher .............................. 71/88 |
| 4,808,417 | 2/1989 | Masuda ........................... 426/2 |
| 5,401,501 | 3/1995 | Pratt ............................... 426/2 |

FOREIGN PATENT DOCUMENTS

| | | |
|---|---|---|
| 616658 | 4/1990 | Australia . |
| 237542 | 1/1991 | European Pat. Off. . |
| 0577034 | 6/1993 | European Pat. Off. . |
| WO 87/01587 | 3/1987 | WIPO . |
| WO 95/28830 | 11/1995 | WIPO . |

OTHER PUBLICATIONS

*Encyclopedia of Polymer Science and Engineering*, vol. 9, 2nd. Ed. (1987), pp. 724–745.

Touraki et al., "Liposome Mediated Delivery of Water Soluble Antibiotics to the Larvae of Aquatic Animals," *Aquaculture* 136 (1995) pp. 1–10.

Villamar et al., "Delivery of Dietary Components to Larval Shrimp (*Penaeus vannamei*) by Means of Complex Microcapsules," *Marine Biology* 115 (1993) pp. 635–542.

*Primary Examiner*—Carolyn Paden
*Attorney, Agent, or Firm*—Fitch, Even, Tabin & Flannery

[57] ABSTRACT

A liquid crustacean foodstuff comprising an encapsulated oil-coated particulate feed in an aqueous media.

16 Claims, No Drawings

FOODSTUFF FOR AND METHOD OF FEEDING CRUSTACEANS AND FISH

BACKGROUND OF THE INVENTION AND DESCRIPTION OF THE PRIOR ART

Aquaculture has become an increasingly significant contributor to the world's seafood supply. Aquaculture operations occur worldwide with a large concentration of such operations occurring in Asia. Typical aquaculture operations take place in contained ponds which are seeded with crustaceans, fish or shellfish. Seed stock is supplied to sophisticated aquafarms by aquaculture systems in which the environment of the contained pond is artificially controlled to provide optimum growth conditions. An increasing demand for seafood products and limits on the amount of seed stock available in nature has created the need for increased production efficiencies in crustacean, shellfish and finfish hatchery and nursery facilities. A critical factor effecting these aquaculture operations is the feeding process.

Conventional aquatic larval feeds are provided in a dry form as a powdered or flaked feed. They generally are poor supplements to live-food organisms fed to hatchery and nursery seed stock. Dry feeds are either added directly to an aquaculture system or mixed with water prior to use. Conventional dry feeds rapidly deteriorate in tank water, with physical decomposition and breakdown of the dry feed starting immediately with wet mixing. The large immediate decomposition that takes place when preparing and using dry feeds results in a significant contamination of culture tank water. With commercial feeding programs that depend on dry and prepared feeds such as flakes, powders and egg custards, the concentration of decomposing organic matter in culture tank water increases as feeding rates increase resulting in high levels of toxic ammonia and other pollutants. The resulting unhealthy water conditions contribute to the proliferation of pathogens including protozoan fouling organisms such as Zoothanmium, thus reducing the overall productivity of the tank.

Stages in the life cycle of certain aquatic organisms, such as shrimp, require critical attention and care in the feeding process. Feeding programs using dry feeds are difficult to automate, require expensive labor intensive practices, and are prone to feeding errors which affect the overall productivity of the system. Further, with the use of dry feeds, significant amounts of nutrients are lost to the water and dry feeds are typically of a size that makes nutrients unavailable to certain aquatic organisms at specific times in their life cycles.

One approach to overcoming some of the disadvantages associated with dry feeds has been the development of micro-encapsulated diets. EP 237542 describes a system where a nutritional component is entrapped in a liposome and the liposome is further encapsulated in a hydrocolloid matrix. The resulting lipogel microcapsules were either stored as a freeze-dried powder or suspended in water containing chloramphenicol. Further, Villamar et al. (*Marine Biology*, 115:635 (1993)) describes the preparation of complex microcapsules (CXMs) consisting of dietary ingredients and lipid-wall microcapsules (LWMs) embedded in particles of a gelled mixture of alginate and gelatin to obtain a single food-particle type used to provide suspension feeders with dietary nutrients. CXMs were lyophilized and stored under nitrogen at −20° C.

It also has been suggested in WO 87/01587 that microcapsules using liposomes are useful to time deliver materials such as medications. These types of microcapsules, however, are based upon phospholipids which form a membrane around the medication which is subject to time release. This type of membrane or barrier is fragile, potentially expensive and difficult to make and would not likely remain a discrete microcapsule when combined with other materials which would desirably form an appropriate part of a feed for marine animals. Moreover, liposomes are capable of providing only low levels of feed for each liposome.

The micro-encapsulated feeds described in the art do not solve all of the problems associated with dry feeds. Production of nutrient in liposomes and their subsequent encapsulation in a hydrocolloid matrix is a labor intensive process which adds to the cost of the final feed. Freeze drying of micro-encapsulated feeds results in oxidation of the lipid component, providing a less desirable feed. Micro-encapsulated feeds that are stored in a lyophilized state still have some of the same disadvantages as described for dry feeds, as the lyophilized feed must still be rehydrated and manually introduced into a tank. Further, the micro-encapsulated feeds described in the prior art have not eliminated the water pollution problems associated with the use of dry feeds.

SUMMARY OF THE INVENTION

The invention provides a liquid foodstuff composition, a method for making a liquid foodstuff and a method for feeding crustaceans, such as larval and post larval shrimp, and fish. The liquid foodstuff includes a particulate feed in a liquid medium and provides an easy convenient way to deliver a nutritionally formulated ration to crustaceans and fish. The liquid foodstuff of the invention includes oil-coated nutrient feed particles which are embedded in a gel or a food in a polymer blend. The gel is crosslinked or complexed to encapsulate the oil-coated nutrient to provide encapsulated oil-coated nutrient feed. To further maintain the marine environment and stabilize the encapsulated oil-coated nutrient feed particles without drying or freeze drying them, the encapsulated oil-coated feed is dispersed and stabilized in a liquid medium for delivery to marine animals.

The oil-coated nutrient feed includes particulate feed, endo-probiotic bacteria and oil in and on the surface of the feed. The endo-probiotic bacteria aids the digestion of the marine animal. The edible oil has a melting point below about 29° C. Typical oils include fish oil, peanut oil, olive oil, corn oil, coconut oil, sunflowerseed oil, cotton seed oil, soybean oil, rapeseed oil and palm oil. The feed is mixed with the oil and the oil forms an inner coating for the particulate feed. The oil in liquid form is intimately mixed with the feed such that the feed is encoated with the oil and the oil is at least on and/or into the surface of the feed. In some cases the oil is substantially homogeneously dispersed throughout the feed particles. This is in contrast to microcapsules formed by liposomes lying as a fragile membrane over the surface of the feed. These liposome microcapsules can be fractured or destroyed in further processing or in a hostile aquatic environment. This destruction can release the contents inside the liposome, which in the case of a marine feed, would contaminate the marine environment.

The oil-coated nutrient feed is enrobed or encapsulated in an outer coating which is a crosslinked gelled matrix to provide a microcapsule foodstuff. In an important aspect, the gel provides a hydrocolloid matrix, and in a particularly important aspect, the hydrocolloid matrix is a gelled blend of alginate and gelatin which blend is crosslinked to encapsulate the oil-coated nutrient. The microcapsules have a size range of from about 50 to about 1000 microns. This encapsulation prevents nutrient from being leached from or moving from the oil-coated nutrient feed into the aqueous environment of the marine animal. Nutrients leached into the aqueous marine environment if not eaten by marine animals, will decompose and contaminate that environment. Such contamination results in increased levels of toxic ammonia and other pollutants.

The liquid medium into which the encapsulated foodstuff is dispersed comprises water and an antimicrobial composition. In an important aspect the antimicrobial is a liquid antimicrobial such as propylene glycol or glycerol. Propionic acid also can be used as a liquid antimicrobial or the salt thereof may be added into the aqueous liquid medium. In a particularly important aspect, the liquid antimicrobial composition is combined with a water soluble antimicrobial salt such as calcium chloride. In another aspect of the invention, the liquid medium also includes ecto-probiotic bacteria. This bacteria grows in the aquatic environment into which the liquid foodstuff is added. The ecto-probiotic metabolizes waste and helps maintain a clean water environment for marine life.

With use of the liquid foodstuff of the invention, not more than about 0.01 grams of nitrogen per gram of liquid feed is converted to nitrogen in ammonia after 24 hours in natural seawater.

DESCRIPTION OF THE PREFERRED EMBODIMENTS

The foodstuff of the invention is made by preparing an oil-coated nutrient feed by mixing a particulate or powdered feed having a particle size in the range of from about 2 μm to about 100 μm, oil and endo-probiotic bacteria. The oil-coated nutrient feed includes the powdered feed, from about 15 to about 30 weight percent, based on the weight of the feed, oil, and from about 0.1 to about 5.0 weight percent, based upon the weight of the feed, endo-probiotic bacteria. Preferably the nutrient feed also includes from about 3 to about 5 weight percent, based upon the weight of the feed, emulsifier and from about 0.02 to about 0.04 weight percent, based upon the weight of the feed, antioxidant. Emulsifiers such as Santone and lecithin may be used. Rendox is a commercially available antioxidant which may be used. The feed and dry ingredients are blended before they are mixed with the oil. The oil serves to make the feed hydrophobic and is on and in the feed. Endo-probiotics which may be used in the product of the invention include dried B. licheniformis and B. subtilis strains commercially available from Cris Hansen's Biosystems.

The particulate feed may be adjusted for the requirements of the marine animal being fed as is known. For shrimp, the feed comprises animal protein, brine shrimp, egg product, betaine, alanine, isoleucine, leucine, serine, valine, glycine, astaxanthin, vitamin A supplement, vitamin B 12 supplement, riboflavin supplement, calcium pantothenate, niacin supplement, vitamin D 3 supplement, vitamin E supplement, menadione sodium bisulfite complex, folic acid, biotin, thiamine, pyridoxine hydrochloride, inositol and choline chloride. The particulate feed may also include medicaments. In one important aspect, edible oil has an IV value of at least about 85 and a melting point below about 29° C. Typical oils include fish oil, peanut oil, olive oil, corn oil, sunflowerseed oil, cotton seed oil, soybean oil and rapeseed oil. In an alternative aspect of the invention, oils having an IV lower than about 85 may be used, for example coconut oil and palm oil. Heating of the oils or particulate feed may be used to maintain the oils in a liquid state for uniform coverage. In an important aspect of the invention, the oil provides the Omega-3 HUFA (highly unsaturated fatty acid) dietary requirements of marine shrimp and fish by providing EPA (eicosapentaenoic acid) and DHA (docosahexenoic acid).

A food in gel blend is made by embedding the oil-coated nutrient feed into a gel which when crosslinked or complexed to encapsulate the oil-coated feed is effective to contain the oil-coated nutrient feed in an aqueous environment. The food in gel blend comprises from about 30 to about 40 weight percent oil-coated nutrient feed and from about 70 to about 60 weight percent gel. Preferably the food in gel blend will comprise from about 38 to about 40 weight percent oil-coated nutrient feed. The gel may be made from a complex coacervate of components, organic polymers, gums such as acacia (gum arabic) and carrageenan, sugar, such as maltodextrins and sucrose, ethyl cellulose, wax, fat or protein. The gel is complexed or crosslinked to provide hydrophobic properties to the oil-coated feed and must be ingestible by the marine animal. Microcapsules formed have a particle size of from about 50 to about 1000 microns. A "complexed coacervate" means an aggregate of colloidal droplets held together by electrostatic attractive forces. It is a mixture of polyelectrolytes which have an appropriate ionic charge and molecular chain lengths to encapsulate the oil-coated feed. The gel also may be a protein which upon crosslinking through in situ or interfacial polymerization will encapsulate the oil-coated feed. The protein also may be denatured to encapsulate the oil-coated food or may be made into microspheres to encapsulate the feed by solvent evaporation.

In an important aspect of the invention, the hydrocolloid gel comprises a gelled blend of alginate, such as sodium alginate and polypeptides or proteins such as gelatin. The alginate and gelatin blend are gelled in water. The ratio of alginate to gelatin is from about 5:1 to about 2.75:1. The protein or polypeptide provides cites opened by proteases which allows the marine animal to digest the feed. Crustaceans, such as shrimp, are capable of masticating the outer coating, such as the crosslinked alginate/gelatin blend, are benefitted by the protein in the outer coating and almost immediately are capable of consuming the oil-coated nutrient. The gel also may include a water soluble hexametaphosphate such as sodium hexametaphosphate, the alginate/gelatin/hexametaphosphate blend having a ratio in the range of from about 5:1:1 to about 2.75:1:0.5.

Processes known in the art that may be adapted for use in encapsulating the oil-coated nutrient feed include complex coacervation (U.S. Pat. No. 2,800,457), polymer-polymer incompatibility (U.S. Pat. No. 3,341,416), interfacial and in situ polymerization (Wittbecker et al., *J. Polym. Sci.* 40:299 (1959); U.S. Pat. Nos. 3,577,515, 4,285,720, and 4,087,376), fluidized-bed and Wurster processes (Hall et al. *Controlled Release Technologies: Methods, Theory and Applications*, Vol. II, CRC Press, Inc. Boca Raton, Fla. (1980)), desolvation, solvent evaporation from emulsions, gelation, pressure extrusion, spray drying and congealing, coextrusion, vacuum coating, and electrostatic deposition, which are further described in *Encyclopedia of Polymer Science and Engineering*, Vol. 9, 2nd Ed. (1987).

In the aspect of the invention where the gel is the alginate/gelatin blend, the food in gel blend is made by blending the oil-coated nutrient feed with the alginate/gelatin blend and deionized water. This provides an aqueous blend which includes the hydrocolloid gel. The pH of the aqueous blend is adjusted to about 12. The oil-coated nutrient feed is encapsulated in the alginate/gelatin matrix by ionically cross linking the gelatin and alginate. This is done by atomizing the food in polymer blend into an aqueous solution of multivalent ion such as from about 5 to about 25 weight percent calcium chloride. This crosslinking reaction provides microcapsules of oil-coated nutrient feed where the oil forms an inner coating and the crosslinked gel forms an outer coating for the nutrient feed.

The resulting microcapsules of oil-coated nutrient feed are sieve separated into desired size, such as from about 50 to about 1000 microns. The capsules are not required to be dried or freeze dried to avoid bacterial degradation and spoilage.

In another aspect of the invention, the food in polymer blend is sprayed into an aqueous solution of multivalent ion, such as calcium chloride, to provide an elongated bead or worm-like product. A process similar to that used to provide microcapsules is utilized with adjustment of pressure and spray rates, such that a worm-like product forms. The worm-like product is desirably about 0.5 to about 5.0 mm wide and about 1 to about 50 mm long. The product may be used as a food for juvenile and adult crustaceans and fish as food for the maturation/reproduction phase of aquaculture field, such as broodstock nutrition.

The liquid foodstuff is provided by blending the microcapsules into water which includes an antimicrobial. In an important aspect, the aqueous blend includes a liquid microbial such as propylene glycol and/or glycerol. The antimicrobial also may include propionic acid or salt thereof in the aqueous blend. In a particularly important aspect of the invention, the aqueous blend includes the liquid antimicrobial and a water soluble antimicrobial salt, such as calcium chloride and sodium chloride. The water soluble antimicrobial salt will increase the specific gravity of the aqueous liquid medium for the microcapsules such that the suspending power of the liquid medium is increased. To further increase the suspending power of the aqueous liquid medium or blend, the liquid antimicrobial is sufficiently viscous such that when the liquid antimicrobial, antimicrobial water soluble salt, and water are blended each will be in amounts effective to stabilize the microcapsules in the aqueous antimicrobial blend for at least about 60 minutes. Product is packaged and sealed under nitrogen to provide shelf stability of at least about 6 months at about 25° C. to about 30° C.

Further the aqueous liquid medium of the liquid foodstuff also includes ecto-probiotic bacteria such as *Bacillus sp.* spores. In one aspect of the invention, the ecto-probiotic comprises about equal amounts of *Bacillus licheniformis* (sold commercially as HB-2 by AMS, Shakepee, Minn.) and *Bacillus subtilis* (sold commercially as AB-1 by AMS, Shakepee, Minn.). While not intending to be bound by any theory, it is thought that the *Bacillus licheniformis*, which is isolated from topsoil, produces large quantities of proteolytic enzymes that attack proteins in decaying organic matter, thus reducing foam on the pond surface and improving water transparency. *Bacillus licheniformis* appears to repopulate the slime layer and compete with pathogenic bacteria that could take over the slime layer and cause disease.

The composition of the invention includes the various component as set forth below.

| | |
|---|---|
| Encapsulated Feed Capsules | from about 30 to about 40 weight % of final product |
| Food in Gel % | from about 30 to about 40 weight % of final product |
| Feed % | from about 9 to about 16% of final product |

-continued

| Component | % of Feed | % of Final Product |
|---|---|---|
| Endo-probiotic (in encapsulated feed) | 0.1–5.0% | 0.01–1.0 |
| Ecto-probiotic (in liquid) | — | 6–12 |
| Propylene Glycol | — | 15–25, (preferably 19%) |
| Antimicrobial Salt ($CaCl_2$, NaCl) | — | 20–30 |
| Feed | 100 | 9–16 |
| Fish Oil | 15–30 | 1.5–5.0 |
| Emulsifiers | | |
| "Santone" | 1–2 | 0.1–0.5 |
| Lecithin | 1.8–3.0 | 0.16–0.48 |
| Antioxidant "Rendox" | 0.02–0.04 | 20–65 ppm |

The following examples set forth exemplary compositions of the invention and how to practice the method of the invention.

EXAMPLE 1

Preparation of Liquid Feed

A mixture of fine powder nutrient feedstuffs containing 1% probiotic bacteria and formulated to provide complete nutrition for larval and postlarval shrimp and fish is mixed with a warm mixture of fish oil, emulsifying agent and antioxidant. The oil used to mix with the feedstuffs has the following specifications.

| | | | |
|---|---|---|---|
| Free Fatty Acid | 0.50% max. | Color, Gardner | 8 max. |
| Iodine Value | 175–200 | Cold Test in Hours | 2 min. |
| Moisture and Imp. max. | 0.50% max. | Peroxide Value, MEQ/KG | 10 |

| Typical Fatty Acid Composition % By Weight | | | |
|---|---|---|---|
| C14:0 | 6.85 | C20:0 | 0.17 |
| C15:0 | 0.46 | C20:1 | 1.48 |
| C16:0 | 14.83 | C20:2 | 0.18 |
| C16:1 | 9.74 | C20:3 | 0.37 |
| C16:2 | 1.62 | C20:4 | 2.09 |
| C16:3 | 1.51 | C20:5 | 14.16 |
| C16:4 | 1.53 | C21:5 | 0.76 |
| C17:0 | 0.38 | C22:0 | 0.10 |
| C18:0 | 2.55 | C22:1 | 0.33 |
| C18:1 | 9.58 | C22:4 | 0.24 |
| C18:2 | 1.93 | C22:5 | 2.82 |
| C18:3 | 1.48 | C22:6 | 10.26 |
| C18:4 | 3.09 | C24:0 | 0.60 |
| C19:0 | 0.00 | C24:1 | 0.22 |

The oil used had the following characteristics.

| | |
|---|---|
| Color (Gardner) | 7.00 |
| Cold Test @32 F. | 3.5 hours |
| Iodine Value | 187 |
| Free Fatty Acids | 0.12% |
| Moisture | 0.11% |
| Peroxide Value | 2.0 |

The lipid coated powder mixture is blended at 40% (w/w) into a warm sodium alginate (2.75% w/w) and gelatin (0.5% w/w) polymer in deionized water adjusted to pH 12.

The resultant 40% food-in-gel blend is atomized into a batch of chilled 20% (w/w) calcium chloride solution by pumping through an external mix spray nozzle assembly supplied with nitrogen gas at 40–120 psi. Upon contacting the calcium chloride solution, the atomized droplets become ionically crosslinked by reaction of calcium atoms with the sodium alginate matrix forming calcium-alginate microcapsules.

The microcapsules are sieve separated into desired sizes ranging from <50 microns to >1000 micron equivalent spherical diameter. These capsules are stabilized in liquid preservative composed of propylene glycol, calcium chloride and an additional probiotic bacteria.

EXAMPLE 2

Comparison of Nitrogen Release from Dry and Liquid Feeds

A total of 25, 2-ton, culture tanks containing seawater were divided into five control tanks (dry feed), and five tanks consisting of four different feeding densities of liquid feed as prepared in Example 1.

A standard feeding program used at the Thai Department of Fisheries research station was used in the control tank. Liquid feed was used to completely replace commercial dry feeds and partly or completely replace *Artemia nauplii* use in the control tanks. Microalgae was the same for all tanks. Shrimp larvae (nauplius stage) were stocked at 200,000 per tank on Day-0. Sample of tank water were removed with time and analyzed for nitrogen content and for the occurrence of Zoothanmium.

Zoothanmium observations through the PL-2 stage showed that 5 of 5 control tanks had zoothanmium infestation, whereas 0 of 20 tanks containing the liquid feed had zoothanmium infestation. Further, shrimp larvae in tanks containing the liquid feed metamorphosed to the PL-1 stage about 1 day sooner than shrimp in the control tanks (dry feed).

Results of ammonia nitrogen analysis were as follows.

| Day | AMMONIA-N (mg/L) | | | | |
|---|---|---|---|---|---|
| | A | B | C | D | E |
| 1 | 0.0075 | 0.0019 | 0.0030 | 0.0039 | 0.0036 |
| 3 | 0.1105 | 0.0254 | 0.0105 | 0.0095 | 0.0227 |
| 6 | 0.3918 | 0.0144 | 0.0163 | 0.01273 | 0.0174 |
| 9 | 0.6689 | 0 | 0 | 0 | 0 |
| 13 | 0.7517 | 0 | 0 | 0 | 0 |
| 16 | 0.2529 | 0.0349 | 0.0192 | 0.0243 | 0.0152 |
| 20 | 1.2934 | 0 | 0.0004 | 0.0042 | 0.0004 |

A: Control (dry feed)
B–E: Liquid Feed
Nitrogen is expressed as a mean value in mg of ammonia nitrogen per liter of tank water.

EXAMPLE 3

Feeding of Shrimp

*Penaeus monodon* Zoea-1 through PL1 are stocked at 100,000 larvae per ton of seawater. The daily ration is divided into 5–6 feedings per tank per day according to the following.

| Stage | Liquid Feed Stages Z–M (cc/Ton SW/day) | Liquid Feed Stages M–PL (cc/Ton SW/day) | Microalgae (cells/ul SW/day) | Brine Shrimp (g cyst*/ton/day) |
|---|---|---|---|---|
| N | — | — | 100 | — |
| Z1 | 20 | — | 100 | — |
| Z2 | 25 | — | 100 | — |
| Z3 | 30 | — | 100 | — |
| M1 | 45 | — | 40 | — |
| M2 | 40 | 20 | 40 | — |
| M3 | 15 | 30 | 40 | — |
| PL1 | 5 | 45 | 20 | — |

Feeding can be adjusted as needed to fit specific hatchery/nursery management practices (i.e., cc/for SW/day).
*Newly hatched brine shrimp (Artemia) nauplii recovered from 5–10 g cyst
cc = cubic centimeter = 1 ml
SW = seawater

What is claimed is:

1. A liquid crustacean foodstuff comprising:
   an enrobed particulate crustacean foodstuff in a liquid media, the liquid media comprising an antimicrobial,
   the enrobed particulate crustacean foodstuff comprising a particulate nutrient feed, an inner coating comprising an edible unsaturated oil having a melting point of below about 29° C. and an outer coating comprising a gel which is complexed or crosslinked to an extent which is effective to contain the oil-coated feed in an aqueous environment and which is ingestible by the crustacean.

2. A liquid crustacean foodstuff as recited in claim 1, wherein the liquid media includes an antimicrobial selected from the group consisting of propylene glycol, glycerol, propionic acid, a water soluble salt of propionic acid, sodium chloride, calcium chloride and mixtures thereof.

3. A liquid crustacean foodstuff as recited in claim 1, wherein the outer coating comprises a crosslinked blend comprising alginate and protein.

4. A liquid crustacean foodstuff as recited in claim 3 wherein the unsaturated edible oil is selected from the group consisting of fish oil, cotton seed oil, peanut oil, soybean oil, sunflowerseed oil, palm oil, coconut oil, rapeseed oil, corn oil, olive oil and mixtures thereof.

5. A liquid crustacean foodstuff as recited in claims 1 or 2 wherein the outer coating comprises a crosslinked blend comprising alginate and gelatin.

6. A liquid crustacean foodstuff as recited in claim 4, wherein the nutrient feed comprises a particulate feed and endo-probiotic bacteria.

7. A liquid crustacean foodstuff as recited in claim 1 wherein the unsaturated edible oil is selected from the group consisting of fish oil, cotton seed oil, peanut oil, soybean oil, sunflowerseed oil, palm oil, coconut oil, rapeseed oil, corn oil, olive oil and mixtures thereof.

8. A liquid crustacean foodstuff comprising:
   an enrobed particulate crustacean foodstuff in an aqueous liquid media, the liquid media comprising an antimicrobial selected from the group consisting of propylene glycol, glycerol, propionic acid, a water soluble salt of propionic acid, sodium chloride, calcium chloride and mixtures thereof, and ecto-probiotic bacteria.

the enrobed particulate crustacean foodstuff comprising a nutrient feed which comprises a particulate feed and endo-probiotic bacteria, the nutrient feed having an inner coating comprising an edible unsaturated oil having a melting point of above about 29° C. and an iodine value of at least about 85 and an outer coating comprising a crosslinked alginate/protein gel.

9. A liquid crustacean foodstuff as recited in claim 8, wherein the outer coating is a crosslinked alginate gelatin gel.

10. A liquid crustacean foodstuff as recited in claim 8, wherein the aqueous liquid media comprises a blend of a liquid antimicrobial selected from the group consisting of propylene glycol, glycerol, propionic acid and mixtures thereof and an antimicrobial water soluble salt in an amount effective for stabilizing the liquid foodstuff.

11. A liquid crustacean foodstuff as recited in claim 10, wherein the water soluble salt is calcium chloride.

12. A liquid crustacean foodstuff as recited in claims 8, 9 or 10, wherein the foodstuff includes from about 0.1 to about 5.0 weight percent endo-probiotic, based upon the weight of the particulate feed.

13. A liquid crustacean foodstuff as recited in claims 8, 9 or 10, wherein the aqueous liquid medium further includes from about 6 to about 12 weight percent, based upon the weight of the liquid foodstuff, ecto-probiotic.

14. A liquid crustacean foodstuff comprising:
an enrobed particulate crustacean foodstuff in an aqueous liquid medium, the enrobed particulate foodstuff comprising a particulate feed having a particle size in the range of from about 2 to about 100 microns, from about 15 to about 30 weight percent, based upon the weight of the particulate feed, edible unsaturated oil and from about 0.1 to about 5.0 weight percent, based upon the weight of the particulate feed, endo-probiotic bacteria, the liquid media comprising water, an antimicrobial water soluble salt and a liquid antimicrobial selected from the group consisting of propylene glycol, glycerol, propionic acid and mixtures thereof, and an ecto-probiotic bacteria,
the enrobed particulate crustacean foodstuff having an inner coating and outer coating, the edible unsaturated oil forming the inner coating on and into the surface of the particulate feed, the oil having a melting point of below about 29° C. and an iodine value of at least about 85, the outer coating comprising a blend of alginate and gelatin which has been gelled and crosslinked.

15. A method for time releasing feed to crustaceans and fish, the method comprising:
adding a liquid foodstuff of claim 14 to an aquatic environment which includes the crustaceans, the liquid foodstuff being added in an amount effective for feeding the crustaceans, but in and amount such that after 24 hours not more than about 0.01 grams of nitrogen per gram of liquid foodstuff is converted to nitrogen in ammonia.

16. A method for making a liquid foodstuff for crustaceans and fish, the method comprising:
enrobing a particulate feed and a endo-probiotic bacteria with an edible unsaturated oil having a melting point of above about 29° C. and an iodine value of at least about 85 to provide an oil-coated nutrient feed;
embedding the oil-coated nutrient feed in an alginate and gelatin gel;
crosslinking the gel to provide an microencapsulated oil-coated feed;
sieve separating the microcapsules containing the oil-coated feed to provide microcapsules with a diameter of from about 50 to about 1000 microns; and
blending the microcapsules into an aqueous liquid media comprising water, an antimicrobial water soluble salt and a liquid antimicrobial selected from the group consisting of propylene glycol, glycerol propionic acid and mixtures thereof, and a ecto-probiotic bacteria.

* * * * *